United States Patent
Bean et al.

(10) Patent No.: US 9,003,560 B1
(45) Date of Patent: Apr. 7, 2015

(54) SECURE ENCLOSURE WITH INTERNAL SECURITY COMPONENTS

(75) Inventors: Reginald D. Bean, Center Point, IA (US); James A. Marek, Anamosa, IA (US); Glenn D. Schillinger, Cedar Rapids, IA (US); Robert B. Ray, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 13/488,878

(22) Filed: Jun. 5, 2012

(51) Int. Cl.
*G06F 21/02* (2006.01)
*G06F 21/12* (2013.01)

(52) U.S. Cl.
CPC ........................................ *G06F 21/12* (2013.01)

(58) Field of Classification Search
USPC ........... 726/2–4, 11, 16, 17, 34; 713/156, 175
See application file for complete search history.

(56) References Cited

U.S. PATENT DOCUMENTS

| | | | | |
|---|---|---|---|---|
| 5,661,803 | A * | 8/1997 | Cordery et al. | 705/60 |
| 5,812,666 | A * | 9/1998 | Baker et al. | 380/277 |
| 5,953,502 | A * | 9/1999 | Helbig, Sr. | 726/24 |
| 6,311,273 | B1 * | 10/2001 | Helbig et al. | 726/2 |
| 6,463,537 | B1 * | 10/2002 | Tello | 713/182 |
| 7,623,666 | B2 * | 11/2009 | Motoyoshi et al. | 380/270 |
| 8,255,988 | B2 * | 8/2012 | Carpenter | 726/17 |
| 2003/0037244 | A1 * | 2/2003 | Goodman et al. | 713/189 |
| 2005/0066197 | A1 * | 3/2005 | Hirata et al. | 713/201 |
| 2008/0120510 | A1 * | 5/2008 | Challener et al. | 713/186 |
| 2009/0271619 | A1 * | 10/2009 | Fujii et al. | 713/164 |
| 2011/0289324 | A1 * | 11/2011 | Yellepeddy et al. | 713/189 |
| 2013/0067534 | A1 * | 3/2013 | Soffer | 726/2 |

OTHER PUBLICATIONS

Microsoft Computer Dictionary 5th Edition, 2002, Microsoft, pp. 213-214.*
FIPS PUB 140-2 published by the department of commerce on May 25, 2001.*
IBM 4758 PCI Cryptographic Coprocessor Release 2.41 Aug. 2002.*

* cited by examiner

*Primary Examiner* — Dede Zecher
*Assistant Examiner* — Richard McCoy
(74) *Attorney, Agent, or Firm* — Angel N. Gerdzhikov; Donna P. Suchy; Daniel M. Barbieri

(57) ABSTRACT

A secured enclosure system and a method for configuring a secured enclosure system are disclosed. The secured enclosure system includes at least one processing module for implementing a processing task, a security module in communication with the processing module for providing a trust anchor functionality to the processing module, a secure backplane in communication with the at processing module for monitoring a connection with the processing module, and a security controller module in communication with the secure backplane for providing a root of trust, for serving as a local system controller, and for serving as a key/certificate manager. An enclosure encloses the components of the system and includes a physical security component for detecting an interference with the enclosure.

9 Claims, 3 Drawing Sheets

SECURE ENCLOSURE WITH INTERNAL SECURITY COMPONENTS

TECHNICAL FIELD

The present disclosure relates generally to enclosed systems and more particularly to security systems for use with enclosed systems.

BACKGROUND

Systems that are utilized onboard vehicles and in the field may include classified information (e.g., algorithms, data, software, and the like) in order to perform the tasks for which the systems were designed. Security for such classified information may be in place, such that, should such system be acquired by an adversary or should such system come under attack, such classified information is not readily divulged or obtained. However, such systems may be designed around open architectures utilizing commercial off the shelf (COTS) components, which typically lack security components. Providing security to such systems is challenging, where computing resources, cost, upgradability, maintenance, and scope of security protection are factors.

Accordingly, there is a need for an integrated security system for a computing platform which may incorporate COTS components.

SUMMARY

The present disclosure is directed to a secured enclosure system. The system may include at least one processing module configured to implement a processing task. The system may also include at least one security module in communication with the at least one processing module. The at least one security module may be configured to provide a trust anchor functionality to the at least one processing module. The system may also include a secure backplane in communication with the at least one processing module. The secure backplane may be configured for monitoring a connection with the at least one processing module. The system may also include a security controller module in communication with the secure backplane. The security controller module may be configured for providing a root of trust, for serving as a local system controller, and for serving as a key/certificate manager. The system may also include a secure enclosure including at least one physical security component for detecting an interference with the secure enclosure. The secure enclosure may enclose the at least one processing module, the at least one security module, the secure backplane, and the security controller module.

An additional embodiment of the present disclosure is directed to a security system. The system may include at least one processing module configured to implement a processing task. The system may also include at least one security module in communication with the at least one processing module. The at least one security module may be configured to provide a trust anchor functionality to the at least one processing module. The system may also include a secure backplane in communication with the at least one processing module. The secure backplane may be configured for monitoring a connection with the at least one processing module. The system may also include a security controller module in communication with the secure backplane. The security controller module may be configured for providing a root of trust, for serving as a local system controller, and for serving as a key/certificate manager.

A further embodiment of the present disclosure is directed to a method of configuring a secured enclosure system. The method may include associating at least one processing module with at least one security module. The at least one processing module may be configured to implement a processing task. The security module may be configured to provide a trust anchor functionality to the at least one processing module. The method may also include establishing a first connection between the at least one processing module and a secure backplane, monitoring the first connection between the at least one processing module and the secure backplane, and establishing a second connection between the secure backplane and a security controller module. The security controller module may be configured for providing a root of trust, for serving as a local system controller, and for serving as a key/certificate manager.

It is to be understood that both the foregoing general description and the following detailed description are exemplary and explanatory only and are not restrictive of the invention claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous objects and advantages of the present invention may be better understood by those skilled in the art by reference to the accompanying figures in which.

DETAILED DESCRIPTION

Reference will now be made in detail to exemplary embodiments of the disclosure, examples of which are illustrated in the accompanying drawings.

Figure 1:
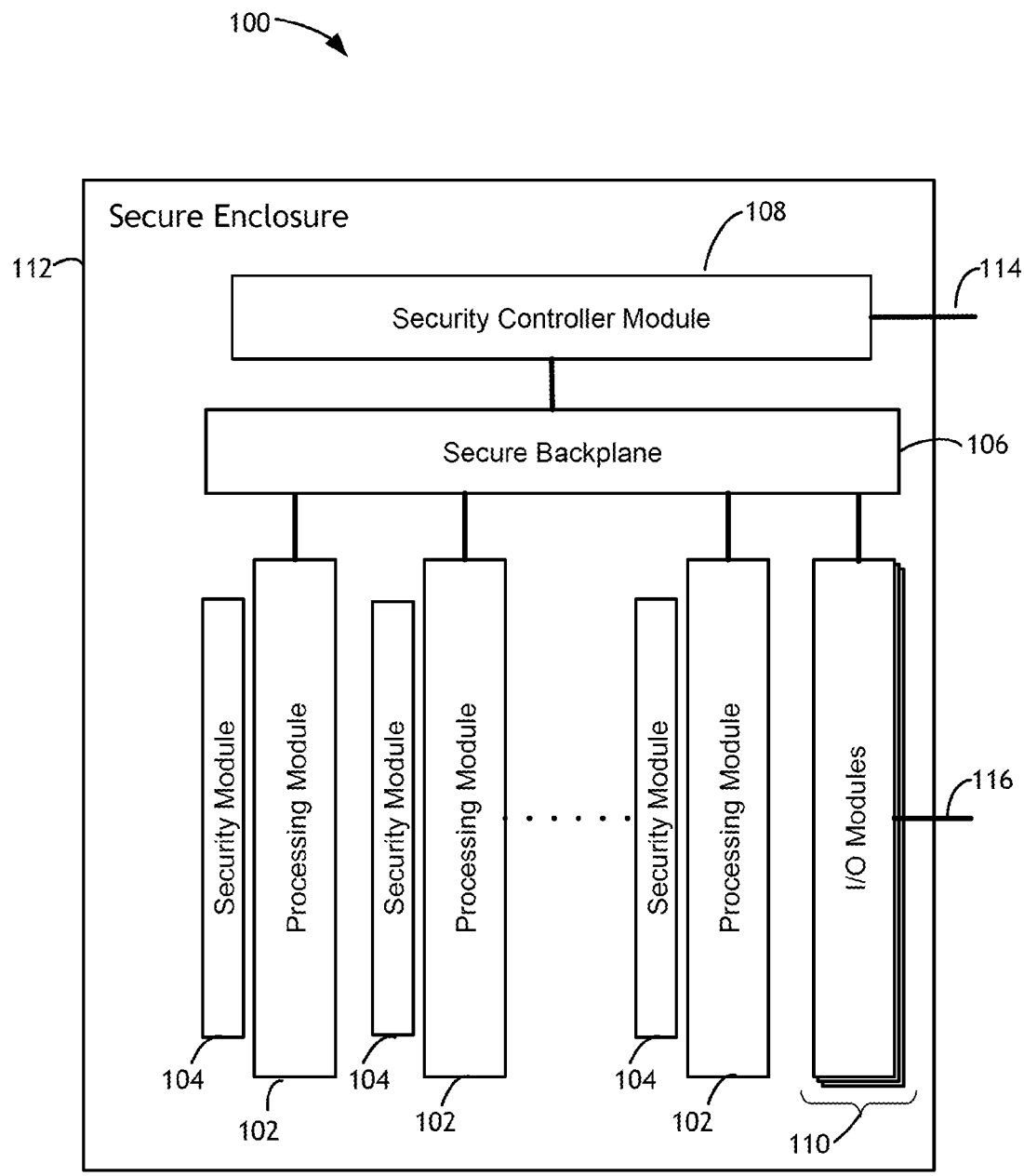
FIG. 1 is a block diagram of a secured enclosure system.

Referring to FIG. 1, a block diagram of a secured enclosure system 100 is shown. The secured enclosure system 100 may include one or more processing modules 102, one or more security modules 104 (which also may be referred to as a security enforcing mezzanine or "SEM" module), a secure backplane 106 (which also may be referred to as a security augmented system interposer or "SASI" module), and a security controller module 108 (which also may be referred to as an enclosure security center or "ESC" module). The secured enclosure system 100 may also include one or more input/output (I/O) modules 110 and a secure enclosure 112.

The processing modules 102 may be modules directed to general purpose and/or specialized processing and I/O functions and may be configured to implement a particular processing task. In certain embodiments, the processing modules 102 may range from general computing platforms for general purpose functionality to specialized hardware implementations for unique tasks. While FIG. 1 illustrates a plurality of processing modules 102 and a plurality of security modules 104, it may be appreciated that the secured enclosure system 100 may include any number (i.e., one or more) of processing modules 102 or security modules 104. In particular implementations, each processing module 102 is in communication with one security module 104, wherein the security module 104 may be configured to provide a trust anchor functionality to the processing module 102 that is in communication with the security module 104. The trust anchor functionality may permit trusted startup for the processing module 102 upon initial startup or in the event the processing module 102 is rebooted.

The secure backplane 106 may be in communication with each processing module 102 and may be in communication with the security controller module 108. The secure backplane 106 may include a backplane having integrated security circuitry to permit the secure backplane 106 to provide interconnect between individual processing modules 102 and between the processing modules 102 and the security controller module 108. The secure backplane 106 may also be configured to monitor interconnects between the secure backplane 106 and other components (e.g., processing modules 102), to provide power switching/filtering (e.g., managing a power utilization of the processing modules 102), and to provide port firewalling capabilities. Additionally, the secure backplane 106 may provide such capabilities in a MLS ("multiple levels of security") environment. In a particular embodiment, the secure backplane 106 uses open standards to ensure that COTS equipment is available for use as the processing modules 102.

The security controller module 108 may be in communication with the secure backplane 106, and in turn, with each processing module 102 and each security module 104. The security controller module 108 may be the root of trust for the local system and may be self-protecting and may serve as a local system controller and key/certificate manager. For instance, the security controller module 108 may store, protect, manage, and distributes keys/certificates to entities within the secure enclosure 112. The root of trust may refer to support for and aggregation/management of keys/certificates, tamper posture, authentication, fault, zeroization and sanitization. The security controller module 108 may include monitoring points, sensor paths, interaction points, or the like to form trusted paths back to the security controller module 108. For instance, the security controller module 108 may deem components that can be reached physically (e.g., through a card-to-card interconnect, a mezzanine port, and the like) through the trusted paths as trusted components. Other components that cannot be physically accessed may not be guaranteed to be trustworthy.

Figure 2:
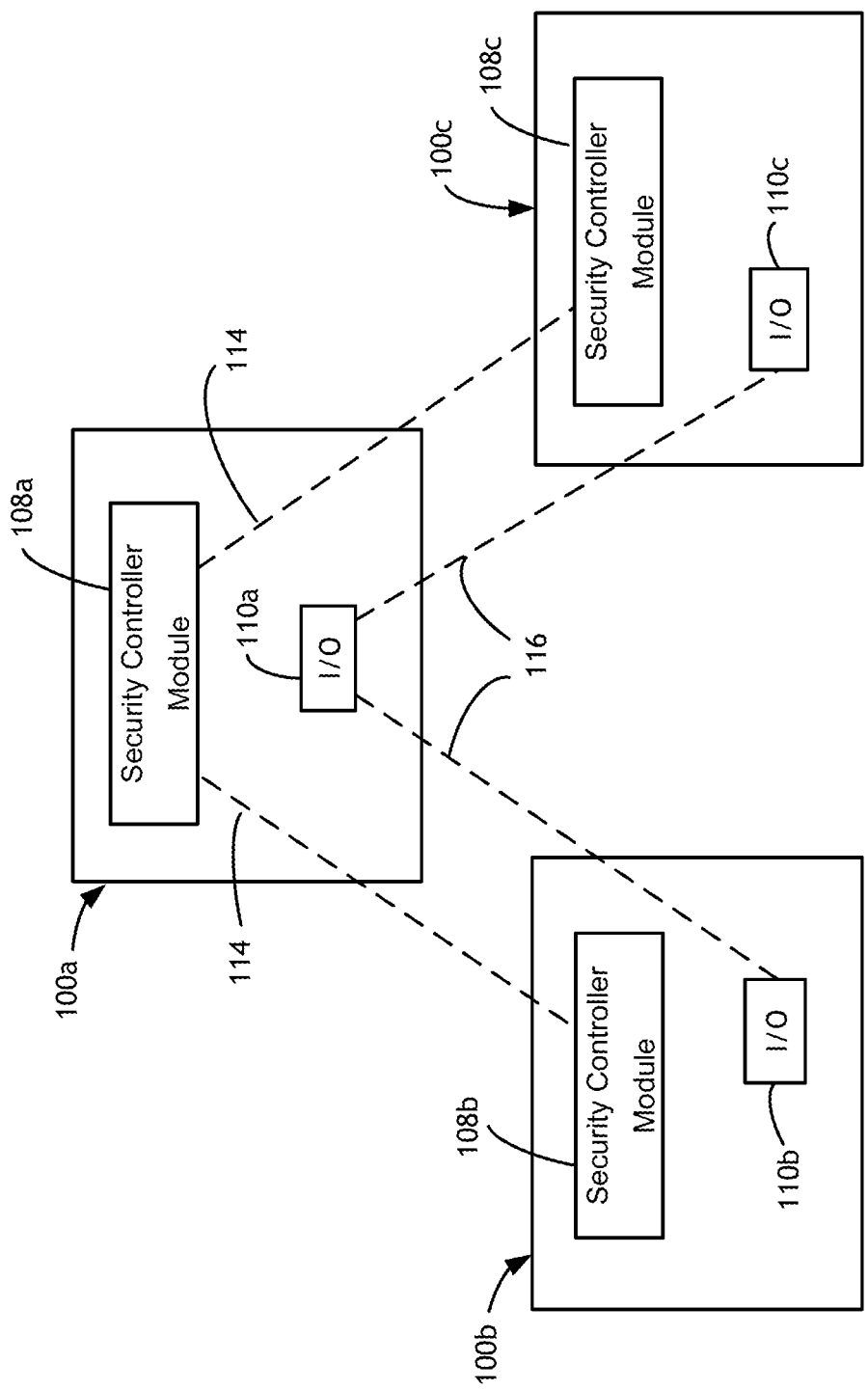
FIG. 2 illustrates a network of multiple secured enclosure systems.

Referring to FIG. 2, the security controller module 108a may include an external interface 114 for connecting to and communicating with other secured enclosures or devices (100b, 100c) of a host system 200, such as via the security controller modules 108b and 108c of the respective devices 100b and 100c. The I/O modules 110a also may be configured to provide an interface port 116a between the local system (i.e., the secured enclosure system 100a) and other secured enclosures or devices (100b, 100c) of the host system 200, such as via the I/O modules 110b and 110c of the respective devices 100b and 100c. While the configuration of FIG. 2 illustrates three secured enclosure systems (100a-100c), the configuration and number of secured enclosure systems is not limited to this particular configuration, and other configurations may be utilized without departing from the spirit and scope of the present disclosure.

The external interface 114 to the security controller module 108 may permit receipt and distribution of keys/certificates depending on whether the security controller module 108 is operating in a master mode or slave mode. In the master mode, the security controller module 108 can distribute keys/certificates to other security controller modules in other secure enclosures. In the slave mode, the security controller module 108 operates on a receive-only basis. In a multi-enclave system, the security controller module 108 may operate across multiple levels of security (MLS). The security controller module 108 may also support a similar master/slave capability for tamper posture, authentication, fault, zeroization and sanitization. Through the use of trusted external interface 114 communication pathways, the secured enclosure system 100a may support scalability and flexibility in the kind and quantity of external end interfaces and devices (e.g., 100b and 100c) needing keys/certificates. The interface port 116 may provide a flexible and scalable means to interface with components and devices (e.g., 100b and 100c) external to the secured enclosure system 100a.

As described previously, the security controller module 108 may provide support for and aggregation/management of keys/certificates, tamper posture, authentication, fault, zeroization and sanitization for the local system (i.e., the secured enclosure system 100). Similarly, the security modules 104 may provide signature verification, zeroization control, and fault monitoring to the processing modules 102. The security modules 104 may also provide to the processing modules 102 other security services such as encryption/decryption of code and data, and the like. For instance, the secured enclosure system 100 may provide a multi-tiered security architecture where the security controller module 108 provides a first tier security and where the security modules 104 provide a higher-tiered security.

The secured enclosure system 100 may permit detection of an unrecognizable event (e.g., access attempt by unauthorized user, unauthorized execution of code, and the like) occurring on one or more of the processing modules 102. When an unrecognizable event occurs, the security module 104 of each affected processing module 102 may shut down the processing module 102 in order to take control of the module 102 and let the security controller module 108 respond. A response may include resetting the processing module 102, such as by cleansing the processing module 102 of all outside information. Other responses include managing the power utilization of the processing module 102, controlling I/O connectivity of the processing module 102, isolating the processing module 102 from any other processing module 102 connected to the secure backplane 106, shutting down one or more ports to the processing module 102, and other security precautions.

The secure enclosure 112 may include at least one physical security component configured for detecting an interference with the secure enclosure 112. Such an interference may include an unauthorized physical breach of the secure enclosure 112 (e.g., opening the secure enclosure 112) or an unauthorized nonphysical breach of the secure enclosure 112 (e.g., attempt to scan contents of secure enclosure 112). The at least one physical security component may include an ambient environment sensor (e.g., temperature sensor, pressure sensor, and the like), a cover switch, or a motion detector. It may be appreciated that this list of physical security components is not comprehensive, and other physical security components may be utilized.

The secured enclosure system 100 and the security augmenting components of the secured enclosure system 100 may provide for use of commercial standards and off the shelf components (COTS) while maintaining a required security level. Depending on the criticality of the items on-board a processing module 102, the security module 104 and security controller module 108 may be configured to provide the level of security needed (e.g., less security for less critical items, and more security for more critical items). The configuration of the secured enclosure system 100 permits security features to be decoupled as needed from the applications residing within the secure enclosure 112, while providing engagement through a common interface definition to allow for adequate protection of the on-board technology.

Figure 3:
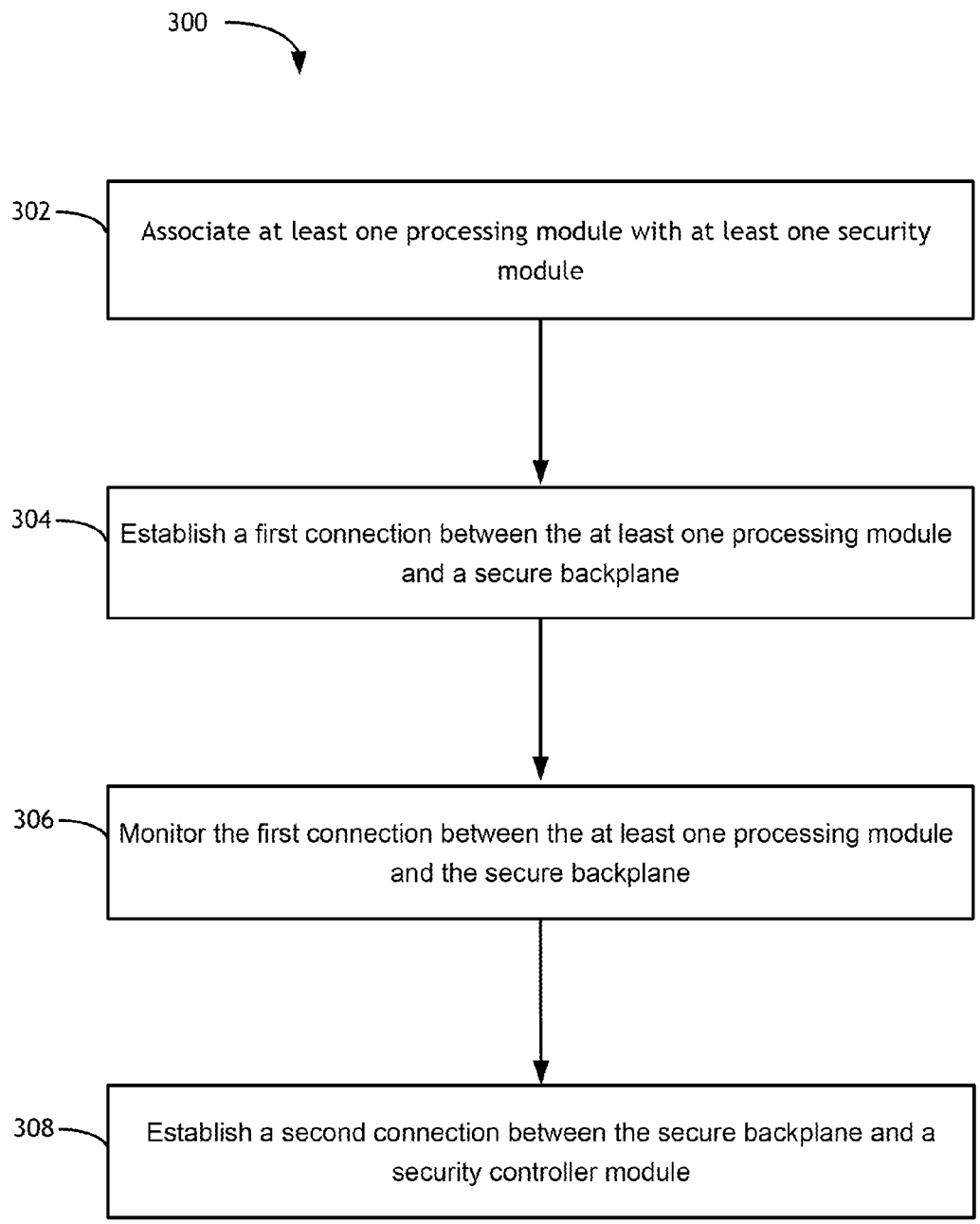
FIG. 3 is a flow chart illustrating a method of configuring a secured enclosure system.

Referring to FIG. 3, a flow chart of a method 300 of configuring a secured enclosure system is shown. Method 300 may include step 302, step 304, step 306, and step 308. Step 302 may include associating at least one processing module with at least one security module, where the at least one processing module is configured to implement a processing task and where the security module is configured to provide a trust anchor functionality to the at least one processing module. Step 304 may include establishing a first connection between the at least one processing module and a secure backplane. Step 306 may include monitoring the first connection between the at least one processing module and the secure backplane. Step 308 may include establishing a second connection between the secure backplane and a security controller module, where the security controller module is configured for providing a root of trust, for serving as a local system controller, and for serving as a key/certificate manager.

It is understood that the present invention is not limited to any underlying implementing technology. The present invention may be implemented utilizing any combination of software and hardware technology. The present invention may be implemented using a variety of technologies without departing from the scope and spirit of the invention or without sacrificing all of its material advantages.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description, and it will be apparent that various changes may be made in the form, construction, and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A secured enclosure system, comprising:
   at least one processing module configured to implement a processing task;
   at least one security module in communication with the at least one processing module, the at least one security module configured to provide a trust anchor functionality to the at least one processing module;
   a secure backplane in communication with the at least one processing module, the secure backplane configured for monitoring a connection with the at least one processing module, the secure backplane further configured to manage a power utilization of the at least one processing module by monitoring an interconnect between the secure backplane and the at least one processing module, the managing a power utilization of the at least one processing module including providing power switching and power filtering to the at least one processing module;
   a security controller module in communication with the secure backplane, the security controller module configured for providing a root of trust, for serving as a local system controller, and for serving as a key/certificate manager, the security controller module configured for:
      associating a key, a certificate, a tamper posture, an authentication, a fault monitoring, a zeroization control and a sanitization with each of the at least one processing module;
      receiving a communication from the secure backplane;
      zeroization of at least one processing module based on the communication and at least one of the key, the certificate, the tamper posture, the authentication, and the fault monitoring;
      operation in a master mode and in a slave mode, the security controller module configured to distribute keys/certificates to a separate security controller module in a separate secure enclosure when the security controller module is in master mode, the security controller module configured to operate on a receive-only basis when the security controller module is in slave mode; and
   a secure enclosure including at least one physical security component for detecting an interference with the secure enclosure, the secure enclosure enclosing the at least one processing module, the at least one security module, the secure backplane, and the security controller module.

2. The secured enclosure system of claim 1, wherein the trust anchor functionality provides for trusted startup of the at least one processing module.

3. The secured enclosure system of claim 1, wherein the at least one physical security component includes at least one of an ambient environment sensor a cover switch and a motion detector.

4. The secured enclosure system of claim 1, wherein the secure backplane includes a backplane having integrated security circuitry.

5. The secured enclosure system of claim 1, wherein the secure backplane is further configured to provide port firewalling to the at least one processing module.

6. A method of configuring a secured enclosure system, comprising:
   associating at least one processing module with at least one security module, the at least one processing module configured to implement a processing task, the security module configured to provide a trust anchor functionality to the at least one processing module;
   associating a secure backplane with the at least one processing module, the secure backplane configured for monitoring a connection with the at least one processing module, the secure backplane further configured to manage a power utilization of the at least one processing module by monitoring an interconnect between the secure backplane and the at least one processing module, the managing a power utilization of the at least one processing module including providing power switching and power filtering to the at least one processing module;
   associating a key, a certificate, a tamper posture, an authentication, a fault monitoring, a zeroization control and a sanitization with each of the at least one processing module;
   establishing a first connection between the at least one processing module and the secure backplane;
   monitoring the first connection between the at least one processing module and the secure backplane;
   establishing a second connection between the secure backplane and a security controller module, the security controller module configured for:

providing a root of trust, for serving as a local system controller, and for serving as a key/certificate manager;

receiving a communication from the secure backplane, the communication including detection of an unrecognizable event via the monitoring of the first connection;

zeroization of at least one processing module based on the communication and at least one of the key, the certificate, the tamper posture, the authentication, and the fault monitoring;

operation in a master mode and in a slave mode, the security controller module configured to distribute keys/certificates to a separate security controller module in a separate secure enclosure when the security controller module is in master mode, the security controller module configured to operate on a receive-only basis when the security controller module is in slave mode;

detecting an interference with the secured enclosure system via at least one physical security component within a secure enclosure, the secure enclosure enclosing the at least one processing module, the at least one security module, the secure backplane, and the security controller module.

7. The method of claim 6, wherein the at least one physical security component includes at least one of an ambient environment sensor, a cover switch, and a motion detector.

8. The method of claim 6, further comprising:

upon detection of an unrecognizable event, shutting down the at least one processing module.

9. The method of claim 6, further comprising:

providing a trusted startup of the at least one processing module via the at least one security module.

* * * * *